US006806736B2

(12) United States Patent
Mercier

(10) Patent No.: US 6,806,736 B2
(45) Date of Patent: Oct. 19, 2004

(54) CIRCUIT FOR A LOSSLESS CAPACITIVE PUMP

(75) Inventor: Claude Mercier, Peterborough (CA)

(73) Assignee: Siemens Milltronics Process Instruments, Ontario (CA)

( * ) Notice: Subject to any disclaimer, the term of this patent is extended or adjusted under 35 U.S.C. 154(b) by 31 days.

(21) Appl. No.: 10/388,440

(22) Filed: Mar. 17, 2003

(65) Prior Publication Data
US 2004/0056683 A1 Mar. 25, 2004

(30) Foreign Application Priority Data

Sep. 19, 2002  (CA) .............................................. 2404185

(51) Int. Cl.[7] .......................... H03K 19/175; G05F 1/10
(52) U.S. Cl. ........................................ 326/88; 327/535
(58) Field of Search .............................. 326/63, 68, 88, 326/92; 327/535, 536, 540, 333, 391, 156, 157, 323, 332, 538, 539

(56) References Cited

U.S. PATENT DOCUMENTS

| 4,810,905 | A | * | 3/1989 | Graham et al. ................ 326/72 |
| 4,918,336 | A | * | 4/1990 | Graham et al. ............. 326/117 |
| 5,568,083 | A | * | 10/1996 | Uchiyama et al. .......... 327/538 |
| 5,804,943 | A | * | 9/1998 | Kollman et al. ............. 320/167 |
| 5,880,628 | A | * | 3/1999 | Criscione et al. ........... 327/589 |
| 5,883,547 | A | * | 3/1999 | Diazzi et al. ................ 327/589 |
| 5,914,632 | A | * | 6/1999 | Fotouhi et al. ............. 327/537 |
| 5,936,459 | A | * | 8/1999 | Hamamoto .................. 327/536 |
| 5,963,025 | A | * | 10/1999 | Colli .......................... 323/288 |
| 6,075,403 | A | * | 6/2000 | Ishikawa et al. ............ 327/536 |
| 6,160,723 | A | * | 12/2000 | Liu .............................. 363/60 |
| 6,304,469 | B1 | * | 10/2001 | Liu .............................. 363/60 |
| 6,437,628 | B1 | * | 8/2002 | Davenport et al. ......... 327/333 |
| 6,605,983 | B2 | * | 8/2003 | Ikeda .......................... 327/536 |
| 6,636,098 | B1 | * | 10/2003 | Kizer .......................... 327/345 |

* cited by examiner

Primary Examiner—Michael Tokar
Assistant Examiner—Linh V Nguyen
(74) Attorney, Agent, or Firm—Harness, Dickey & Pierce, P.L.C.

(57) ABSTRACT

A capacitive pump circuit suitable for use in loop powered level measurement and time of flight ranging systems. The capacitive pump circuit comprises an input buffer, a level shifter and an output stage. The input buffer receives a clocking signal which is also coupled to the input of the output stage through the level shifter. The output from the input buffer is switched by the output stage to charge a capacitor and generate a voltage output which has the opposite polarity of the voltage supply rail. According to another aspect, a capacitive voltage doubler circuit is provided which is also suitable for use in loop powered level measurement and time of flight ranging systems.

15 Claims, 2 Drawing Sheets

CIRCUIT FOR A LOSSLESS CAPACITIVE PUMP

FIELD OF THE INVENTION

The present invention relates to electronic circuits and more particularly to a circuit arrangement for a capacitive pump.

BACKGROUND OF THE INVENTION

Capacitive inverters are used to create a negative, i.e. inverted, voltage output in a circuit. Known capacitive inverters are made with two diodes and two capacitors. The arrangement of diodes reduces the output voltage by at least two diode voltage drops. The voltage drops associated with the diodes can be reduced by using Schottky diodes, but even Schottky diodes are susceptible to losses. For example, at −40° C., the loss due to each Schottky diode could easily be greater than 0.4V giving a total voltage loss of approximately 0.8V.

The losses associated with the diodes become more of a factor if a low level voltage, e.g. 3.3V or lower, is being inverted.

Accordingly, there remains a need for a capacitive inverter which minimizes losses.

BRIEF SUMMARY OF THE INVENTION

The present invention provides circuitry for a capacitive inverter which produces an output with minimum losses. In another aspect, the capacitive inverter has minimal quiescent current.

In a first aspect, the present invention provides capacitive pump circuit comprising: (a) a buffer having a supply input coupled to a voltage supply rail, an input for receiving a clocking signal and having an output; (b) a level shifter having an input for receiving the clocking signal and an output; (c) an output stage having a first input, a second input, and an output port for outputting a voltage, and an output capacitor, the first input being coupled to the output of the buffer through another capacitor, the second input being coupled to the output of the level shifter; (d) the output stage including first and second transistors connected in a push-pull configuration, the first and second transistors having a control terminal connected to the output of the level shifter, the first transistor having an input terminal connected to a ground rail and an output terminal connected to an input terminal of the second transistor, the connection forming the first input for the output stage, and the second transistor having an output terminal, the output terminal forming the output port, and the output capacitor having one terminal coupled to the output terminal and another terminal coupled to the ground rail.

In another aspect, the present invention provides a voltage doubler circuit comprising: (a) a buffer having a supply input coupled to a voltage supply rail, an input for receiving a clocking signal and having an output; (b) a level shifter having an input for receiving the clocking signal and an output; (c) an output stage having a first input, a second input, and an output port for outputting a voltage, and an output capacitor, the first input being coupled to the output of the buffer through another capacitor, the second input being coupled to the output of the level shifter; (d) the output stage including first and second transistors connected in a push-pull configuration, the first and second transistors each having a control terminal, an input terminal, and an output terminal, the control terminals for the first and said second transistors being connected to the output of the level shifter, the output terminal of the first transistor being connected to one terminal of the output capacitor to form the output port, and the input terminal of the first transistor being connected to the output terminal of the second transistor and one terminal of the capacitor coupled to the output of the buffer, the connection forming the first input for the output stage, and the input terminal of the second transistor being coupled to the other terminal of the output capacitor and the supply voltage rail.

BRIEF DESCRIPTION OF THE DRAWINGS

Reference is next made to the drawings, which show by way of example, embodiments of the present invention and in which.

DETAILED DESCRIPTION OF THE PREFERRED EMBODIMENT

Figure 1:
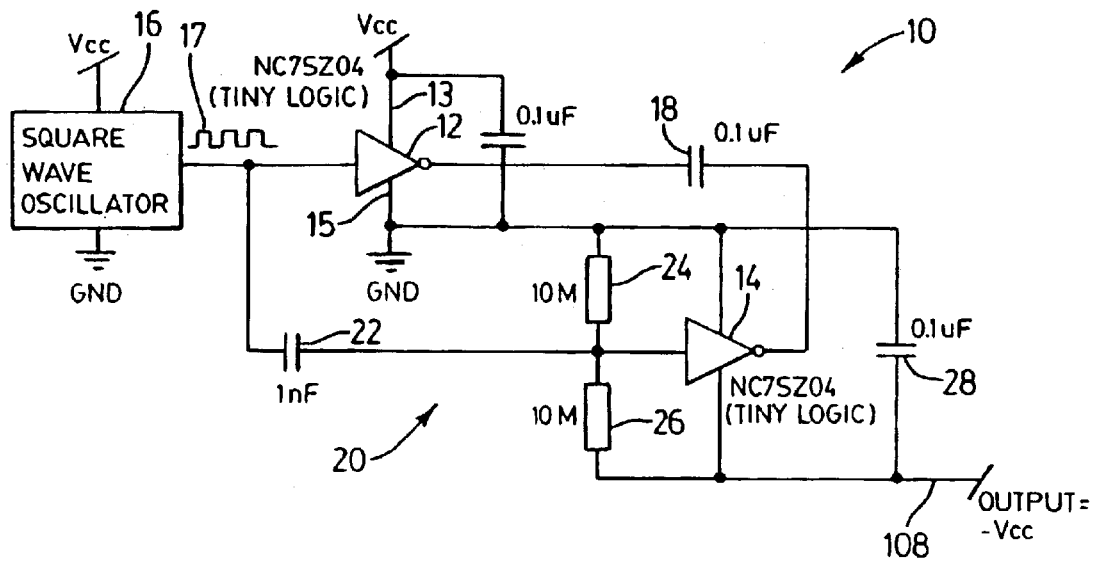
FIG. 1 is a schematic diagram of a capacitive pump or inverter according to a first embodiment of the present invention.

Reference is first made to FIG. 1 which shows in schematic a capacitive pump circuit 10 according to a first embodiment of the present invention. As will be described, the capacitive pump or inverter circuit 10 generates a negative output voltage $-V_{cc}$ from a positive voltage input or rail $V_{cc}$, as will be described in more detail below.

The capacitive pump 10 includes a first logic gate 12 and a second logic gate 14. The logic gates 12, 14 are shown as inverters but may both comprise non-inverting gates, and other types of logic gates, for example, OR, AND, NOR, NAND, and Exclusive OR gates. The logic gates 12, 14 are implemented using 'tiny logic' devices, i.e. integrated circuits having one gate per package, such as the NC7SZ04 series of devices.

The input of the first logic gate 12 is coupled to the output of an oscillator 16 which feeds a square wave signal (indicated by reference 17) to the gate 12. The first logic gate 12 functions to buffer the input square wave signal 17 which drives the circuit 10 to produce the negative voltage rail $-V_{cc}$ as described in more detail below. The oscillator 16 may be tapped from another circuit (not shown). For example, if the positive voltage rail $V_{cc}$ is generated by a switching power supply (not shown), then the switching clock for the power supply, typically between 100 to 500 kHz, may be used to provide the square wave signal 17. The logic gate 12 has a supply terminal 13 which is coupled to the positive voltage supply rail $V_{cc}$ and a ground terminal 15 which is coupled to signal ground GND.

The second logic gate 14 provides a switching function. As shown, the output of the first logic gate 12 is coupled to the output of the second logic 14 through a capacitor 18. The output from the first logic gate 12 drives the output stage of the second logic gate 14 as described in more detail below.

Figure 2:
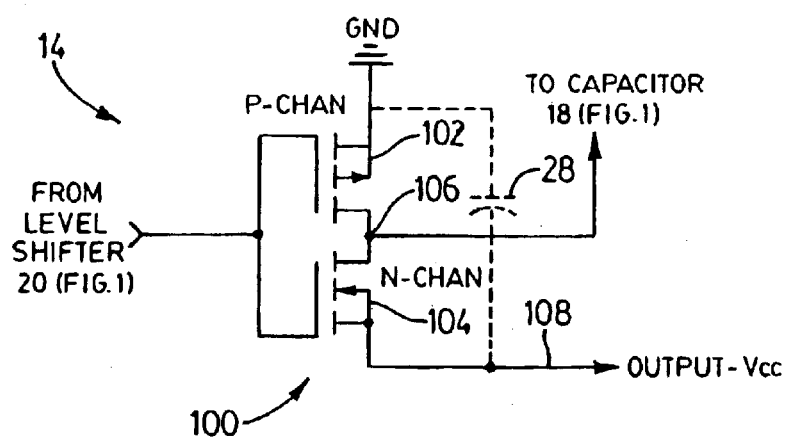
FIG. 2 is a schematic diagram of the output configuration for the logic gate element of FIG. 1.

As shown in FIG. 2, the second logic gate 14 (and also the first logic gate 12) has an output stage 100 comprises a pair of transistors indicated by references 102 and 104, respectively. For the NC7SZ04 family of tiny logic devices, the transistors 102, 104 for the output stage 100 comprise MOSFET devices. As shown the MOSFET transistors 102, 104 are connected in a push-pull arrangement. The source of the first MOSFET 102 is coupled to the positive voltage rail supply $V_{cc}$, and the drain is coupled to the source of the second MOSFET 104. This connection also forms the output terminal for the gate 104 under conventional use. However, in the context of the capacitive pump 10, the source of the second MOSFET 104 functions as an input 106 and receives the output from the first logic gate 12. The drain of the second MOSFET 104, which in conventional use of the gate 14 is connected to the signal ground GND, functions as an output terminal 108 for the gate 14 for the negative voltage supply rail $-V_{cc}$ It is also possible to use TTL type devices instead of CMOS based devices, however there will be some losses associated with the TTL based tiny logic devices.

Since the second gate 14 operates between signal ground GND and the negative voltage rail $-V_{cc}$, a level shifter indicated by reference 20 in FIG. 1 is provided. The level shifter 20 as shown in FIG. 2 comprises a capacitor 22, and pair of resistors 24 and 26. The level shifter 20 functions to put the input for the second gate 14 in a suitable voltage range for operation of the gate 14. As shown in FIG. 2, the two resistors 24 and 26 form a voltage divider and are coupled between the ground rail GND and the negative output rail −Vcc. A capacitor 28 is also coupled between the ground rail GND and the negative output rail −Vcc as shown in FIG. 1.

Reference is again made to FIG. 1 to describe the operation of the capacitive pump circuit 10. Consider first, the square wave signal 17 at logic level 0 applied to the input of the first gate 12. The gate 12 produces an output equal to logic level 1 or Vcc. The output of the first logic gate 12 is coupled to the output of the second logic gate 14. The level shifter 20 also applies the logic level 0 signal to the input of the second logic gate 14. As described above with reference to FIG. 2, the output of the second logic gate 14 comprises two internal transistors, the P-channel MOSFET 102 and the N-channel MOSFET 104, connected in a push-pull arrangement. The logic level 1 appears at the node 106 for the transistor pair, but since the second logic gate 14 is referenced to signal ground GND, the output of the second logic gate 14 is zero volts or logic level 0. With the logic level 0 signal applied to the input of the gate 14 from the level shifter 20, the internal P-channel MOSFET 102 (FIG. 2) in the second logic gate 14 is turned on, and the capacitor 18 and the MOSFET 102 charge to Vcc.

Referring to FIG. 1, when the oscillator 16 changes the state of the square wave signal 17 to logic level 1, the output from the first logic gate 12 becomes logic level 0, i.e. 0 Volts. The level shifter 20 transmits logic level 1 signal to the input of the second logic gate 14. The logic level 1 signal at the input of the second logic gate 14 causes the internal N-channel MOSFET transistor 104 (FIG. 2) to turn on and the capacitor 18 discharges through the internal N-channel MOSFET transistor 104 (FIG. 2) and the stored energy is transferred to the capacitor 28. as shown in FIG. 1, the positive terminal of the capacitor 28 is connected the ground rail GND and the negative terminal is connected to the negative voltage rail −Vcc. Eventually, after a few cycles of energy transfer, the capacitor 18 is charged with exactly voltage Vcc and since the positive side of the capacitor 28 is connected to the ground rail GND, the negative side of the capacitor 28 which is also forms the negative voltage rail −Vcc is pulled to −Vcc volts.

Referring to FIG. 2, the two MOSFET transistors 102 and 104 are utilized as switches to charge and discharge the capacitors 18 and 28 as described above. The MOSFET transistors 18 and 28 preferably have a low stray input capacitance in order to provide a rapid switching function. Furthermore, the low input capacitance results in a lower quiescent current, for example, in the range of 19 uA for the NC7SZ04 type devices. This means that in addition to fast switching, it is not necessary to regulate the negative output voltage rail −Vcc for small loads. The efficiency of the capacitive pump circuit 10 is also enhanced by utilizing an existing oscillator 16 to generate the square wave input or clocking signal 17.

The efficiency of the capacitive pump circuit 10 makes the circuit suitable for loop powered applications, such as loop powered time of flight ranging or level measurement systems.

Figure 3:
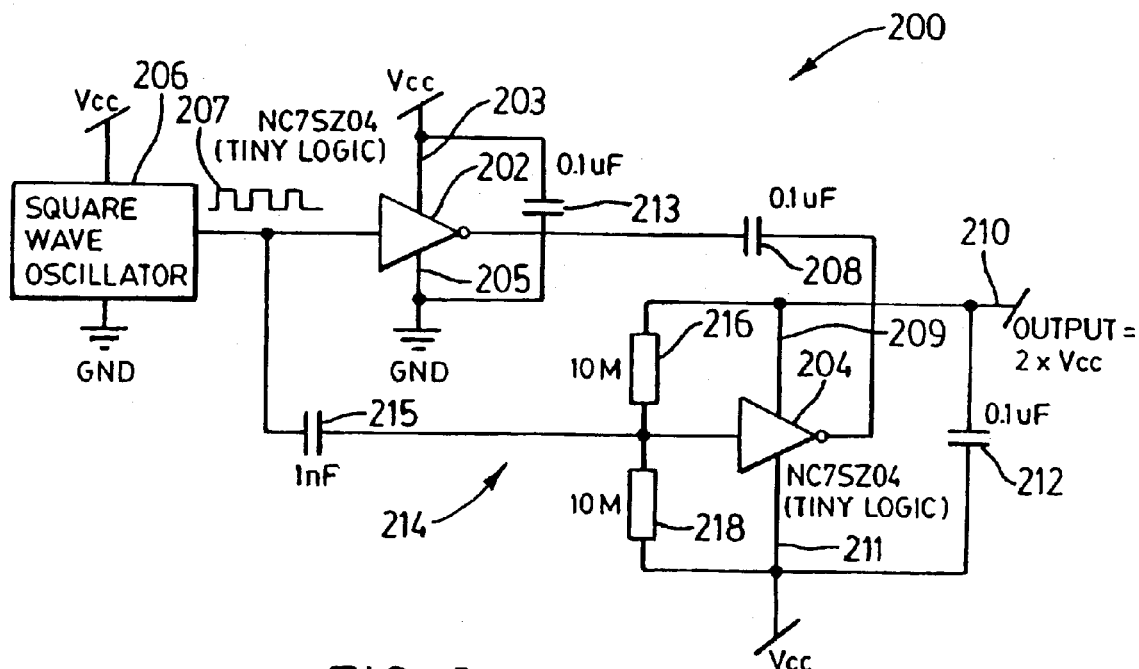
FIG. 3 is a schematic diagram of a capacitive pump voltage doubler circuit according to another embodiment of the present invention.

Reference is next made to FIG. 3, which shows a capacitive pump circuit according to another embodiment of the present invention that functions as a capacitive voltage doubler circuit and is indicated generally by reference 200 in the drawing. The capacitive voltage doubler circuit 200 utilizes the circuit arrangement for the capacitive pump circuit 10 to generate an output voltage that is two times the input supply voltage level, for example, if the supply voltage is Vcc, then the output generated is 2×Vcc.

As shown in FIG. 3, the capacitive voltage doubler circuit 200 comprises a first logic gate 202 and a second logic gate 204. The logic gates 202, 204 are coupled to a voltage supply rail Vcc and a ground rail GND.

The input of the first logic gate 202 is coupled to the output of an oscillator 206 which feeds a square wave signal (indicated by reference 207) to the gate 202. The first logic gate 202 functions to buffer the input square wave signal 207 which drives the doubler circuit 200 to produce the two times supply voltage output Vcc. As for the capacitive pump circuit 10, the oscillator 206 may be tapped from another circuit (not shown). For example, if the positive voltage rail $V_{cc}$ is generated by a switching power supply (not shown), then the switching clock for the power supply, typically between 100 to 500 kHz, may be used to provide the square wave signal 207. This circuit topology allows the doubler circuit 200 (and the pump circuit 100) to be conveniently integrated into an existing circuit, for example, in a loop powered level measurement or time of flight ranging system. The logic gate 202 has a supply terminal 203 which is coupled to the positive voltage supply rail $V_{cc}$ and a ground terminal 205 which is coupled to the ground rail GND.

As shown, the output of the first logic gate 202 is coupled to the output of the second logic 204 through a capacitor 208. The second logic gate 204 has a voltage supply terminal 209 and a ground terminal 211. The voltage supply terminal 209 is not connected to the supply voltage rail Vcc, but rather forms an output 210 for the doubled voltage, i.e. 2×Vcc. The ground terminal 211 of the second logic gate 204 is connected to the positive supply voltage rail Vcc as shown in FIG. 3. A capacitor 212 is coupled between the output 210 and the ground terminal 211 for the second logic gate 204. Another capacitor 213 is coupled between the voltage supply rail Vcc and the ground rail GND for the first logic gate 202 as shown in FIG. 3.

Similar to the capacitive pump circuit 100 described above with reference to FIG. 1, the capacitive voltage doubler circuit 200 includes a level shifter circuit 214 which is coupled between the input of the first logic gate 202 and the second logic gate 204. The level shifter 214 comprises a capacitor 215, and pair of resistors 216 and 218. The level shifter 214 functions to put the input for the second gate 204 in a suitable voltage range for operation of the gate 204. As shown in FIG. 3, the two resistors 216 and 218 form a voltage divider and are coupled between the output 210 and the voltage supply rail Vcc which as described above is coupled to the ground terminal of the second gate 204.

The second logic gate 204 provides a switching function. The output from the first logic gate 202 drives the output stage of the second logic gate 204 in a similar manner as described above with reference to FIG. 2.

Figure 4:
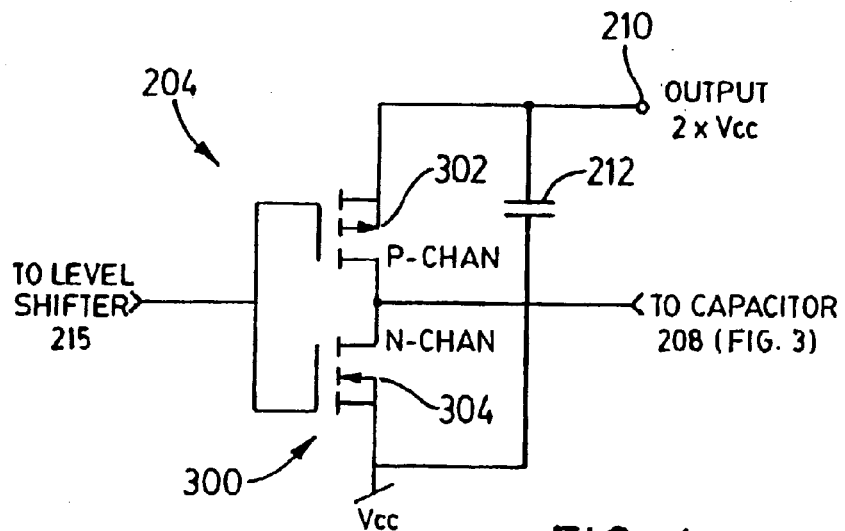
FIG. 4 is a schematic diagram for the output stage of the capacitive pump voltage double of FIG. 3.

Reference is next made to FIG. 4 which shows in schematic form the output configuration for the capacitive voltage doubler circuit 200. As shown in FIG. 4, the second logic gate 204 has an output stage 300 comprising a pair of transistors indicated by references 302 and 304, respectively. For the NC7SZ04 family of tiny logic devices, the transistors 302, 304 for the output stage 300 comprise MOSFET devices. The MOSFET transistors 302, 304 are connected in a push-pull arrangement. The source of the first MOSFET 302 is coupled to one terminal of the capacitor 212 and forms the output 210 for the doubler circuit 200. The drain is coupled to the source of the second MOSFET 304, and this node forms an input and is coupled to the output of the first logic gate 202 through the capacitor 208 as shown in FIG. 3 The drain of the second MOSFET 304, which in conventional use of the logic gate 304 would be connected to the signal ground GND, is coupled to the positive voltage supply rail Vcc. As also shown in FIG. 4, the capacitor 212 is coupled across the two MOSFET transistors 302 and 304.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A capacitive pump circuit comprising:
   (a) a buffer having a supply input coupled to a voltage supply rail, an input for receiving a clocking signal and having an output;
   (b) a level shifter having an input for receiving said clocking signal and an output;
   (c) an output stage having a first input, a second input, and an output port for outputting a voltage, and an output capacitor, said first input being coupled to the output of said buffer through another capacitor, said second input being coupled to the output of said level shifter;
   (d) said output stage including first and second transistors connected in a push-pull configuration, said first and second transistors having a control terminal connected to the output of said level shifter, said first transistor having an input terminal connected to a ground rail and an output terminal connected to an input terminal of said second transistor, said connection forming the first input for said output stage, and said second transistor having an output terminal, said output terminal forming said output port, and said output capacitor having one terminal coupled to said output terminal and another terminal coupled to said ground rail.

2. The capacitive pump circuit as claimed in claim 1, wherein said voltage supply rail comprises a positive supply voltage, and the output voltage generated at said output port is a negative supply voltage level.

3. The capacitive pump circuit as claimed 2, wherein said first and second transistors comprise MOSFET devices, each having a source, drain and gate terminals, the gate terminals of said first and second transistors being connected to the output of said level shifter, the source terminal of said first transistor being connected to the ground rail and the drain terminal of said first transistor being connected to the source terminal of said second transistor, and the drain terminal of said second transistor forming said output port.

4. The capacitive pump circuit as claimed in claim 3, wherein said clocking signal has a frequency in the range 100 to 500 kiloHertz.

5. The capacitive pump circuit as claimed in claim 4, wherein said buffer and said output stage each comprise a single gate in an integrated circuit device, said integrated circuit device having a supply voltage terminal and a ground terminal, the supply voltage terminal for the integrated circuit device for said butter being coupled to said voltage supply rail end the ground terminal being coupled to said ground rail, and the supply voltage terminal for the integrated circuit device for said output stage being coupled to said ground rail and the ground terminal being coupled to one terminal or said output capacitor and forming said output port.

6. The capacitive pump circuit as claimed in claim 5, wherein said clocking signal has a frequency in the range 100 to 500 kiloHertz.

7. The capacitive pump circuit as claimed in claim 5, wherein said integrated circuit device comprises a NC7SZ04 tiny logic device.

8. The capacitive pump circuit as claimed in claim 7, wherein said clocking signal has a frequency in the range 100 to 500 kiloHertz.

9. A capacitive voltage doubler circuit comprising:
   (a) a buffer having a supply input coupled to a voltage supply rail, an input for receiving a clocking signal and having an output;
   (b) a level shifter having an input for receiving said clocking signal and an output;
   (c) an output stage having a first input, a second input, and an output port for outputting a voltage, and an output capacitor, said first input being coupled to the output of said buffer through another capacitor, said second input being coupled to the output of said level shifter;
   (d) said output stage including first and second transistors connected in a push-putt configuration, said first and second transistors each having a control terminal, an input terminal, and an output terminal, the control terminals for said first and said second transistors being connected to the output of said level shifter, the output terminal of said first transistor being connected to one terminal of said output capacitor to form said output port, and the input terminal of said first transistor being connected to the output terminal of said second transistor end one terminal of the capacitor coupled to the output of said buffer, said connection forming the first input for said output stage, and the input terminal of said second transistor being coupled to the other terminal of said output capacitor and the supply voltage rail.

10. The capacitive voltage doubler circuit as claimed 9, wherein said first and second transistors comprise MOSFET devices, each having a source, drain and gate terminals, the gate terminals of said first and second transistors forming said second input and being connected to the output of said level shifter, the drain terminal of said first transistor being connected to one terminal of sold output capacitor and forming said output port, the source terminal of said first transistor being connected to the drain terminal of said second transistor and forming said first input, and the source terminal of said second transistor being connected to said voltage supply rail and the other terminal of said output capacitor.

11. The capacitive voltage doubler circuit as claimed in claim 10, wherein said clocking signal has a frequency in the range 100 to 500 kiloHertz.

12. The capacitive voltage doubler circuit as claimed in claim 11, wherein said buffer and said output stage each comprise a single gate in an integrated circuit device, said integrated circuit device having a supply voltage terminal and a ground terminal, the supply voltage terminal for the integrated circuit device for said buffer being coupled to said voltage supply rail and the ground terminal being coupled to said ground rail, and the supply voltage terminal for the integrated circuit device for said output stage being coupled to one terminal of said output capacitor and forming said output port, the ground terminal being coupled to said voltage supply rail.

13. The capacitive voltage doubler circuit as claimed in claim 12, wherein said clocking signal has a frequency in the range 100 to 500 kiloHertz.

14. The capacitive voltage doubler circuit as claimed in claim 12, wherein said integrated circuit device comprises a NC7SZ04 tiny logic device.

15. The capacitive voltage doubler circuit as claimed in claim 14, wherein said clocking signal has a frequency in the range 100 to 500 kiloHertz.

* * * * *